(12) United States Patent
Mizobuchi et al.

(10) Patent No.: US 6,708,204 B1
(45) Date of Patent: Mar. 16, 2004

(54) TERMINAL APPARATUS HAVING NETWORK COMMUNICATION CAPABILITIES

(75) Inventors: Ayumi Mizobuchi, Tokyo (JP); Kasumi Takeda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/578,389

(22) Filed: May 25, 2000

(30) Foreign Application Priority Data

May 25, 1999 (JP) .......................................... P11-144263

(51) Int. Cl.[7] .............................................. G06F 15/16
(52) U.S. Cl. ...................................................... 709/206
(58) Field of Search ......................................... 709/206

(56) References Cited

U.S. PATENT DOCUMENTS 5,891,182 A * 4/1999 Fleming ....................... 607/50
6,411,393 B1 * 6/2002 Wakasugi .................. 358/1.15
6,567,404 B1 * 5/2003 Wilford ....................... 370/389

* cited by examiner

*Primary Examiner*—David Y. Eng
(74) *Attorney, Agent, or Firm*—Jay H. Maioli

(57) ABSTRACT

A plurality of users can use network communication capabilities such as an electronic mail capability of one terminal apparatus with simplified operation by employing external memory separate from a terminal apparatus. The information necessary for transferring an electronic mail as ISP information and mail account information is read from the external memory loaded in a loading section of the terminal apparatus. The electronic mail capability is executed by use of this read information. Data to send and data received are stored in the external memory.

15 Claims, 7 Drawing Sheets

FIG. 7A

Memory Stick(MS)
K1 — Personalize
K2 — Format
Name: User1
Total Capacity: 2000KB
Used  Unused
Amount Used: 1500KB
Mail: 1000KB
Web: 500KB "Format" SELECTED → FORMATTING MS CARD
"Cancel" SELECTED ←

"Cancel" SELECTED ↑ | ↓ "Personalize" SELECTED

FIG. 7B

Memory Stick(MS)
Name: User1
Total Capacity: 2000KB
● User1  ○ User2  ○ User3
○ New
Cancel — K3
OK — K4

"Back" SELECTED ↑ | ↓ "New" SELECTED THEN "OK" SELECTED

FIG. 7C

Network
K5 — Back
K6 — Next
ISP:
Login Name:
Password:
Access #:
Primary DNS:
Secondary DNS:

"Back" SELECTED ↑ | ↓ "Next" SELECTED

FIG. 7D

E-Mail
K7 — Back
K8 — Done
Name:
Password:
Mail Account:
Mail Address:
POP3:
SMTP:

↓ "Done" SELECTED

RETURN TO MEMORY CARD INFORMATION SCREEN

TERMINAL APPARATUS HAVING NETWORK COMMUNICATION CAPABILITIES

The present invention relates generally to a terminal apparatus having network communication capabilities preferably for use in electronic note pads having network communication capabilities such as electronic mail and WWW (World Wide Web) browser capabilities and personal computers.

For terminal apparatuses having communication capabilities to use network communication capabilities such as electronic mail and WWW browsing, ISP (Internet Service Provider) information and mail account information must be set on these terminal apparatuses beforehand for network connection.

The ISP information includes DNS (Domain Name System) of the ISP to be connected, a password, and an access point telephone number. As for the mail capability, mail account information includes mail user account information, POP3 (Post Office Protocol) server information, and SMTP (Simple Mail Transfer Protocol) server information.

In conventional terminal apparatuses having network communication capabilities, it is normally supposed that one terminal be used by one user. Therefore, the above-mentioned ISP information and mail account information are set only for one user using that terminal.

However, it is sometimes advantageous if two or more users use the network communication capabilities of one terminal apparatus.

It is necessary for the realization of this requirement to set the ISP information and mail account information of each of the users to the terminal apparatus beforehand and, at the same time, provide a memory area for storing data to be transferred for each of the users.

In other words, a user whose ISP information and mail account information are not set to a terminal apparatus and whose memory area is not allocated thereto beforehand cannot use the network communication capabilities such as the electronic mail capability of that terminal apparatus.

The network communication capabilities such as electronic mail becomes usable if the ISP information and mail account information of that user are set and the memory area is allocated immediately before using the network communication capabilities. However, the settings of ISP information and mail account information are cumbersome and takes time, thereby making it unrealistic for users to make necessary settings immediately before using the network communication capabilities.

It is also necessary to prepare in the terminal apparatus a memory area enough for storing the mail data of each user. If the number of users to share that terminal apparatus is not certain, it is impossible to allocate the memory areas of a proper size.

If the memory areas having an insufficient size is allocated, such memory areas store only ISP information and mail account information and may not store electronic mail data, thereby disabling the users to use the network communication capabilities.

Therefore, in the conventional terminal apparatuses, users who can use the network communication capabilities of a particular terminal apparatus are limited to only those whose ISP information and mail account information have been set and memory areas have been allocated.

For two or more users to use the network communication capabilities of one terminal apparatus, it is necessary to use the ISP information and mail account information of each of these users set to that terminal apparatus as the information for network communication applications such as an electronic mail application. This, however, requires the introduction of the concept for terminal application log-in and log-off.

However, if the users are not well familiar with network communication, it is difficult for them to correctly understand the log-in/log-off concept, thereby bringing about a situation in which the network communication capabilities are substantially not fully used.

SUMMARY OF THE INVENTION

It is therefore an object of the present invention to provide a terminal apparatus that allows two or more users to share the network communication capabilities of that terminal apparatus by simple and easy operations.

In carrying out the invention and according to a first aspect thereof, there is provided a terminal apparatus having a network communication capability, comprising: a loading section in which an external memory is loaded; and network communication capability executing means for reading such information necessary for using the network communication capability as ISP (Internet Service Provider) information and user mail account information from the external memory loaded in the loading section, executing data transfer operation of the network communication capability by using the read information, and storing data received by the network communication capability into the external memory According to the invention, when using the network capabilities such as an electronic mail capability, the ISP information and the mail account information stored in the external memory in the loading section are read and, by use of these pieces of information, the network communication capabilities such as an electronic mail capability are executed.

Consequently, the users of the network communication capabilities need not preset such information necessary for transferring electronic mails as ISP information and mail account information. The users are required only to load the external memory into the loading section of the terminal apparatus for using the network communication capabilities.

For example, any user who owns the external memory in which such information necessary for electronic mail transfer as his or her own ISP information and account information can use the electronic mail capability of the terminal apparatus.

In carrying out the invention and according to a second aspect thereof, there is provided a terminal apparatus having a network communication capability, comprising: a loading section in which an external memory is loaded; external memory loading detecting means for detecting loading of the external memory in the loading section; and control means for making the network communication capability usable when loading of the external memory in the loading section is confirmed by a detection output of the external memory loading detecting means.

According to the invention, simply loading the external memory into the terminal apparatus makes usable such network communication capabilities of that terminal apparatus electronic mail and WWW browser capabilities.

Consequently, any user not familiar with network communication can use network communication capabilities without making the cumbersome initial setting necessary for network communication.

In carrying out the invention and according to a third aspect thereof, there is provided as recited in claim 8 appended hereto a terminal apparatus having a network communication capability, comprising: a loading section in which an external memory is loaded; external memory unloading detecting means for detecting unloading of the external memory from the loading section; communication capability executing means for executing the network communication capability by reading such information necessary for using the network communication capability as ISP (Internet Service Provider) information and mail account information from the external memory loaded in the loading section and using the read information and the usable network communication capability; and control means for ending the network communication capability when unloading of the external memory from the loading section is confirmed by a detection output of the external memory unloading detecting means.

According to the invention, unloading the external memory from the terminal apparatus automatically ends such network communication capabilities as electronic mail. Therefore, if plural users use a single terminal apparatus, the individuality of the network communication capability such as electronic mail can be reserved.

In carrying out the invention and according to a fourth aspect thereof, there is provided as recited in a terminal apparatus having a network communication capability, comprising: a loading section in which an external memory is loaded; external memory loading/unloading detecting means for detecting loading and unloading of the external memory into and from the loading section; and control means for making the network communication capability usable when loading of the external memory in the loading section is confirmed by a detection output of the external memory loading/unloading detecting means and, when the external memory loading/unloading detecting means detects unloading of the external memory from the loading section, ending the network communication capability on the basis of a detection output of the external memory loading/unloading detecting means.

According to the invention, loading the external memory into the terminal apparatus makes the network communication capabilities such as electronic mail usable and unloading the external memory from the terminal apparatus ends the use of the network communication capabilities. Consequently, the log-in/log-off concept of an electronic mail application and an Internet home page access application (such as a browser) can be realized by the loading and unloading of the external memory on the terminal apparatus, thereby allowing users not well familiar with network communication to intuitively understand the concept and use the network communication capabilities with ease.

BRIEF DESCRIPTION OF THE DRAWINGS

These and other objects of the invention will be seen by reference to the description, taken in connection with the accompanying drawing, in which:

FIGS. 7A, 7B, 7C, and 7D are diagrams illustrating display screens for describing the mail information setting in the embodiment shown in FIG. 1.

DETAILED DESCRIPTION OF PREFERRED EMBODIMENT

This invention will be described in further detail by way of example with reference to the accompanying drawings. In the following embodiment, a terminal apparatus has an electronic mail capability as one of network communication capabilities.

Figure 1:
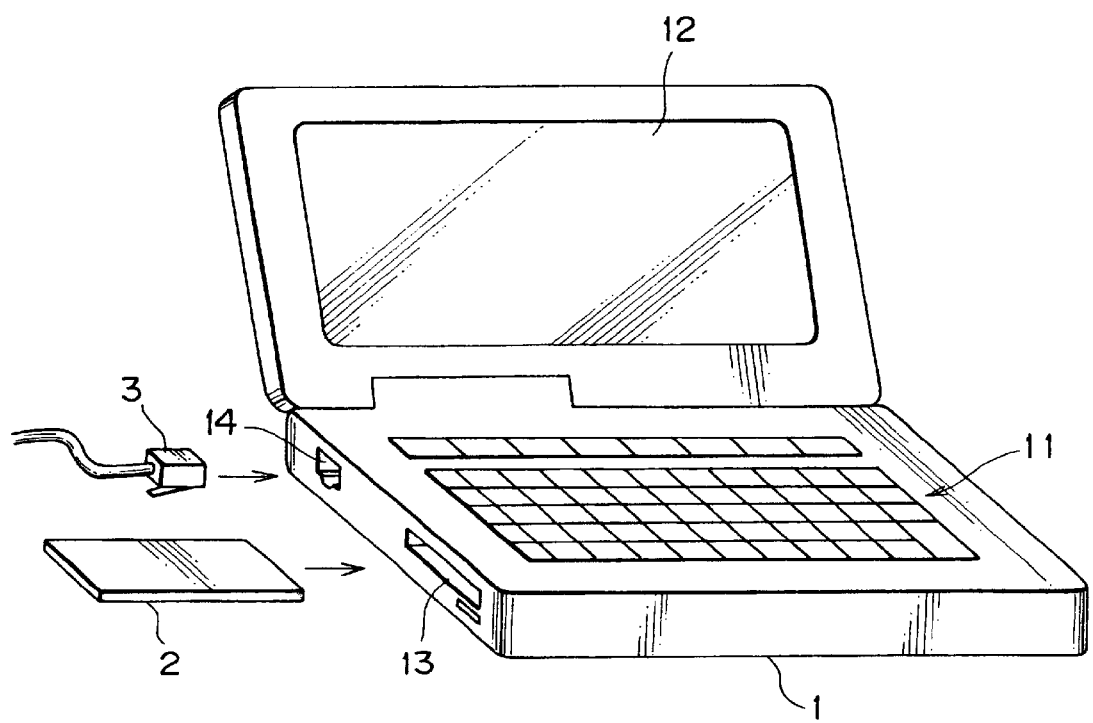
FIG. 1 is an external view of an terminal apparatus having network communication capabilities practiced as one preferred embodiment of the invention.
Figure 2:
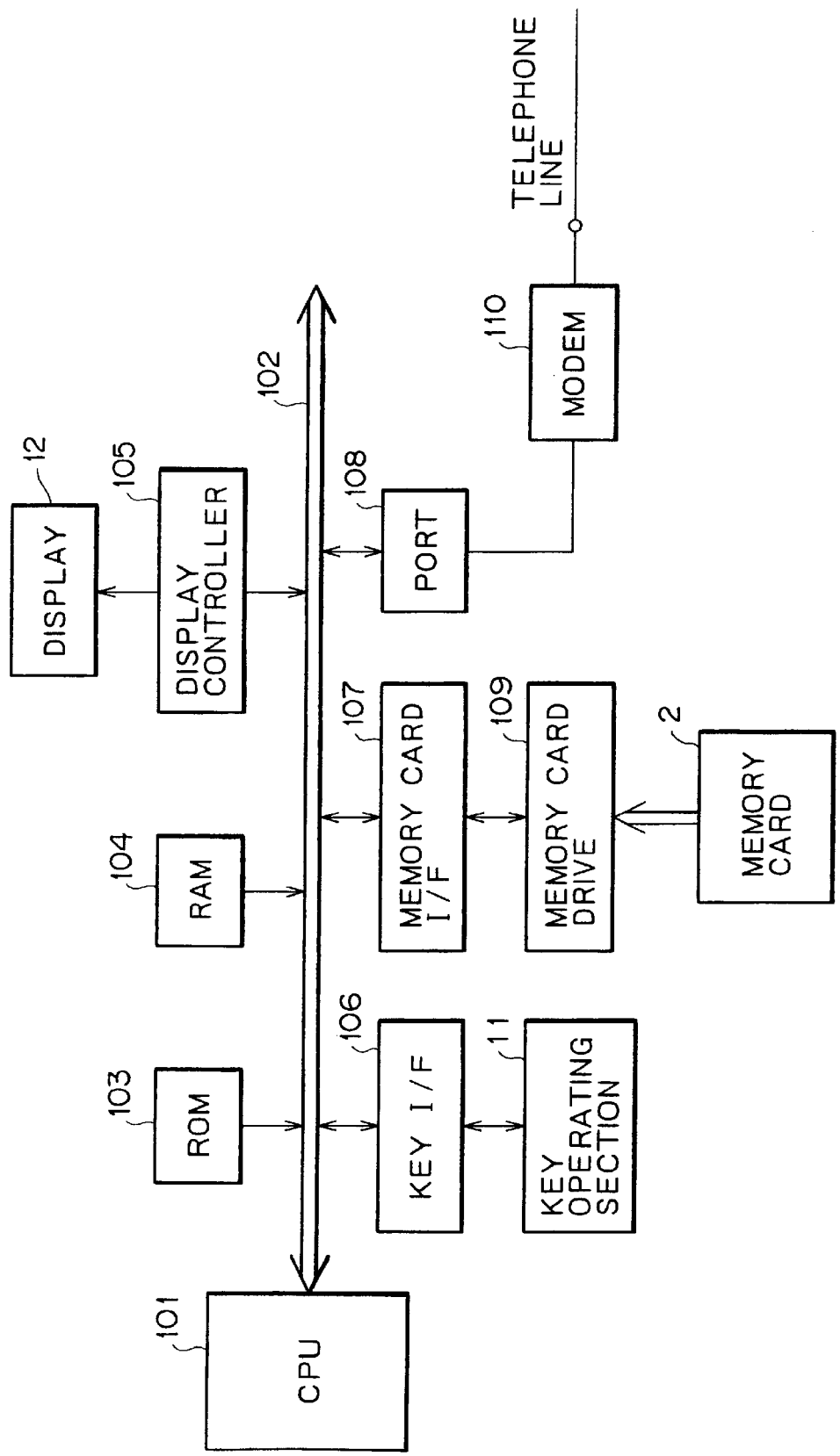
FIG. 2 is a block diagram illustrating an exemplary configuration of the embodiment shown in FIG. 1.

Now, referring to FIG. 1, there is shown an external view of a terminal apparatus 1 having network communication capabilities, the apparatus being practiced as one preferred embodiment of the invention. Referring to FIG. 2, there is shown an exemplary hardware configuration of the terminal apparatus 1.

As shown in FIG. 1, the terminal apparatus 1 has a key operating section 11, a display 12 with touch panel, memory card port 13 for accommodating a memory card 2, which is an external memory, and a modular jack 14 in which a modular plug 3 connecting to a telephone line is plugged. The display 12 is an LCD (Liquid Crystal Display) for example. The key operating section 11 has a key pad composed of menu keys, cursor keys, an enter key, numeric keys, alphabetical keys, and an escape key.

The memory card 2 is a Memory Stick (trademark) for example.

As will be described, the terminal apparatus 1 incorporates a modem. When the modular plug 3 is plugged in the modular jack 14, the modem is connected to the telephone line to make the terminal apparatus 1 ready for the transfer of electronic mail data.

As shown in FIG. 2, the terminal apparatus 1 is based on a microprocessor. To be more specific, in the terminal apparatus 1, a CPU 101, a program ROM 103, a work area RAM 104, a display controller 105, a key interface 106, a memory card interface 107, and an input/output port 108 are interconnected by a system bus 102.

The display 12 is connected to the display controller 105. The key operating section 11 is connected to the key interface 106. A memory card drive 109 is connected to the memory card interface 107. When the memory card 2 is loaded in the terminal apparatus 1 through the port 13, the memory card drive 109 detects the loading and informs the CPU 101 thereof. When the memory card 2 is unloaded from the port 13, the memory card drive 109 informs the CPU 101 thereof. In addition, under the control of the CPU 101, the memory card drive 109 reads and writes information from and to the memory card 2 loaded through the port 13.

The port 108 is also connected to a modem 110. As described, this modem 110 is connected to the telephone line when the modular plug 3 is plugged in the modular jack 14.

In the present embodiment, the terminal apparatus 1 at least has an electronic mail capability, the application software for it being stored in the ROM 103. In the present embodiment, this electronic mail application can be started only when the memory card 2 is loaded on the terminal apparatus 1.

When the memory card 2 is unloaded from the terminal apparatus 1, the terminal apparatus 1 automatically ends the electronic mail application, thereby ending the electronic mail capability.

The terminal apparatus 1 accepts, for each mail user, the ISP information and mail account information necessary for receiving and sending electronic mail and writes these pieces of information to the memory card 2 for each mail user (this capability is hereafter referred to as a mail information setting capability). In this case, one unit of memory card 2 can store the information of only one mail user.

When the memory card storing the ISP information and user mail account information necessary for sending and receiving electronic mail is loaded to start the electronic mail capability, the ISP information and mail account information stored in this memory card are used to execute necessary network connections, thereby executing the electronic mail capability.

The following describes in further detail the capabilities associated with electronic mail in the present embodiment with reference to the flowcharts shown in FIGS. 3 through 6. The processing routines shown in these flowcharts are executed by the CPU 101.

For example, when the terminal apparatus 1 is powered on, the processing routines start and a menu list is shown on the display 12 (step S1). The user selects a desired function by operating a cursor key and the enter key on the key operating section 11.

The CPU 101 determines whether the key operation on the key operating section 11 has been operated by the user (step S2). If the decision is yes, the CPU 101 determines which key has been operated (step S3).

If the key operation done is for a function other than the above-mentioned mail setting capability or the execution of electronic mail (that is, the selection of the mail capability), then, in step S4, the CPU 101 processes the selected function.

If the key operation done is for the mail setting capability, then, in step S5, the CPU 101 determines whether the memory card 2 is loaded in the terminal apparatus 1. If the memory card 2 is found not loaded in the terminal apparatus 1, the CPU 101 shows a message on the display 12 prompting the loading of the card memory 2 (step S6). If the CPU 101 determines that the escape key on the key operating section 11 has been pressed without loading the memory card 2 onto the terminal apparatus 1 (step S7), the CPU 101 returns to the menu display screen of step S1.

Figure 4:
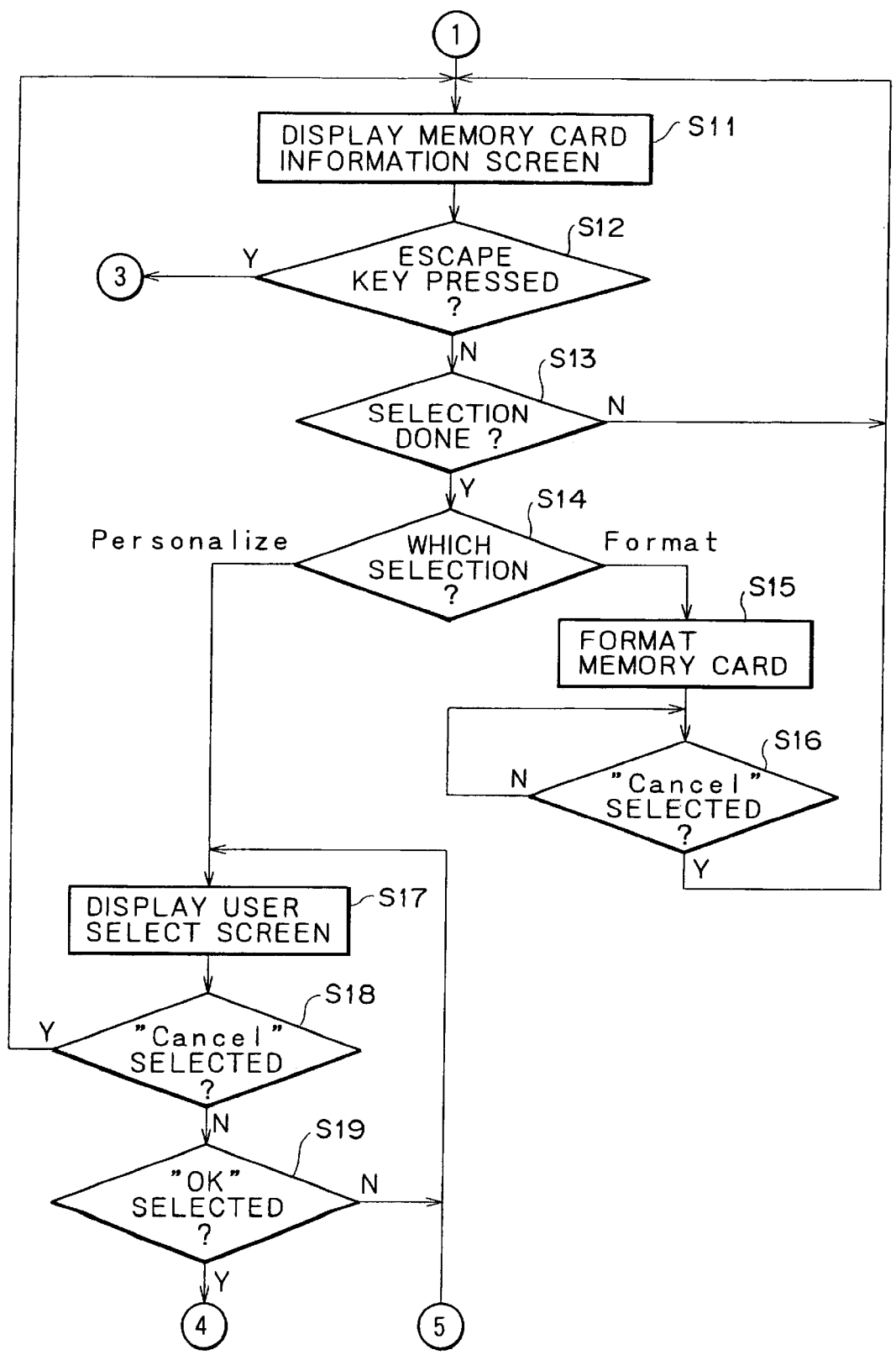
FIG. 4 is a continuation to the flowchart shown in FIG. 3.

If the memory card 2 is loaded by the user without pressing the escape key, the CPU 101 determines it in step S5 and starts the processing routine for the mail information setting capability shown in FIG. 4.

Namely, the CPU 101 goes from step S5 to step S11 shown in FIG. 4 and displays an information screen about the memory card 2 as shown in FIG. 7A. This information screen shows the user name, total memory size, and memory size in use of the loaded memory card 2.

This information screen also shows two key icons K1 and K2 of "Personalize" and "Format", which the user can selectively operate through the key operation section 11. The key icon selecting operation is the same as that to be executed in the following.

Key icon K1 "Personalize" is for starting the execution of the mail setting capability. Key icon K2 "Format" is for formatting the memory card 2 if it has not been formatted for use in the terminal apparatus 1 of the present embodiment.

When the user presses the escape key with the information screen of the memory card 2 of FIG. 7A shown (step S12), the CPU 101 returns the menu display screen of step S1. If the user presses the key icon K1 or K2 without pressing the escape key, the CPU 101 detects it in step S13 and determines in step S14 which of the keys K1 an K2 has been pressed.

If the CPU 101 determines in step S14 that the key icon K2 "Format" has been pressed, then, the memory card 2 loaded on the terminal apparatus 1 is formatted in step S15. Although not shown in FIG. 7, a window opens in the information screen on the display 12 to show that the formatting is going on. When the memory card 2 has been formatted and the user operates a key icon "Cancel" displayed in that window, the CPU determines it in step S16 to close the above-mentioned window, returning to the information screen about the memory card 2 shown in step S11.

If the CPU 101 determines in step S14 that the user has operated the key icon K1 "Personalize," the CPU 101 starts the execution of the mail information setting capability. Then, in step S17, a window opens in the information screen as shown in FIG. 7B, displaying a user selection screen for selectively setting a user of the memory card 2.

In the present embodiment, the ISP information and mail account information about a user previously registered by the mail information setting capability are stored in a memory (non-volatile memory, not shown) of the terminal apparatus 1. The name of that user is displayed in the window shown in FIG. 7B. This simplifies the mail setting because the previously registered information such as ISP information and mail account information can be used again when a registered user uses a new memory card 2. The window shown in FIG. 7B also shows "New" indicative of a new user, as one of selected users.

If the user is a previously registered user, the user selects that user name; if the user is a new user, the user selects "New" To cancel user selection, the user operates key icon K3 "Cancel" in the window. When the user has completed the user selection, the user operates key icon K4 "OK."

The CPU 101 first determines whether key icon K3 "Cancel" has been operated (step S18). If key icon "Cancel" is found operated, the CPU 101 returns to the information screen of step S1. If key icon K3 "Cancel" is found not operated, the CPU 101 determines whether key icon K4 "OK" has been operated (step S19). If this key icon is found not operated, the CPU 101 returns to the user selection screen (FIG. 7B) of step S17.

Figure 5:
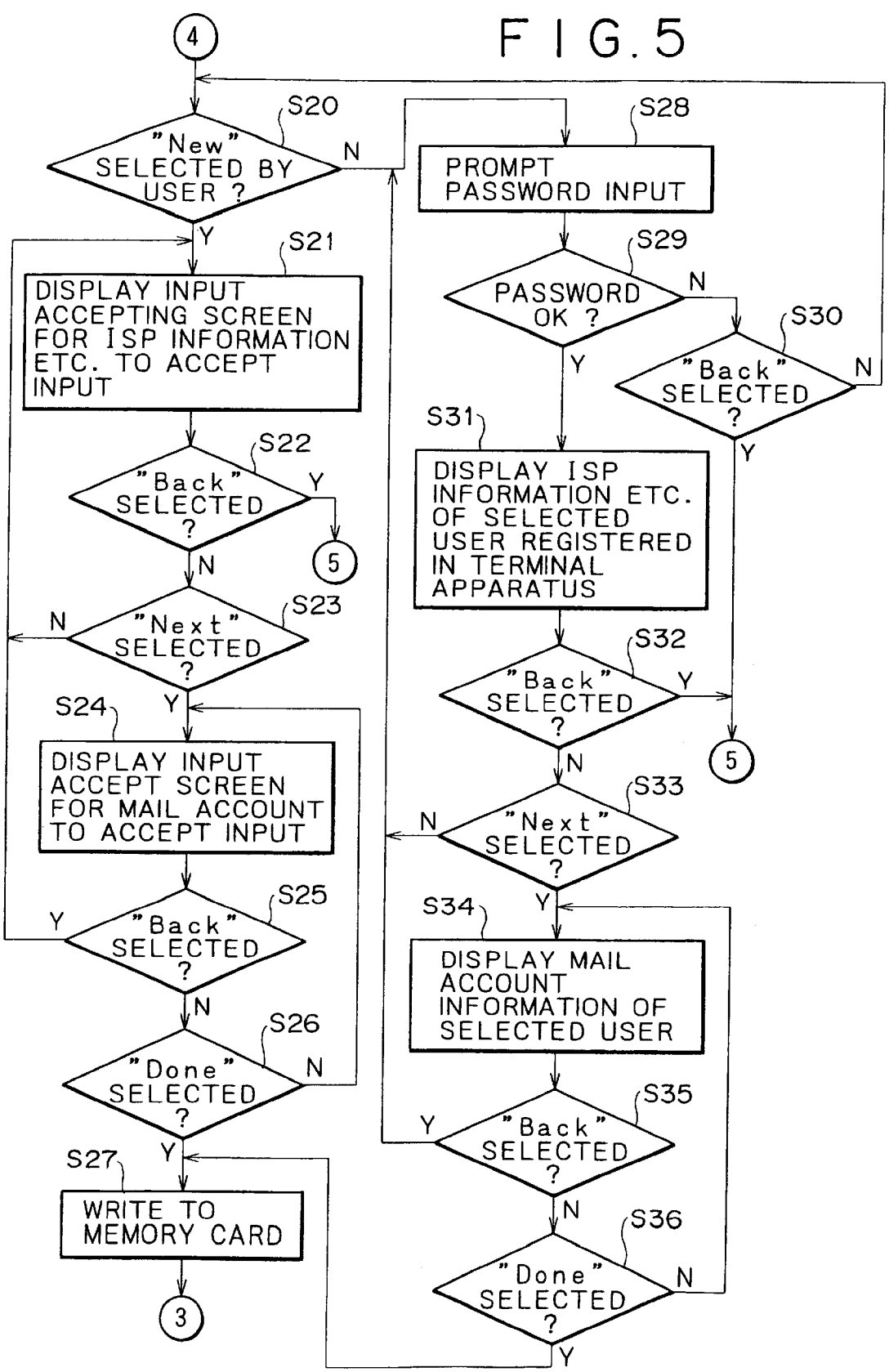
FIG. 5 is another continuation to the flowchart shown in FIG. 3.

If, in step S19, key icon K4 "OK" is found operated, then, the CPU 101 determines in step S20 in FIG. 5 whether the selected user is a new user "New."

If the selected user is found a new user, then the CPU 101 displays a screen for accepting inputs such as ISP information shown in FIG. 7C, accepting the inputs such as ISP information entered by the user.

In step S22, the CPU 101 determines whether key icon K5 "Back" has been operated. If this key icon is found operated, the CPU 101 returns to the user selection screen (FIG. 7B) of step S17. If key icon K5 "Back" is found not operated, the CPU 101 determines whether key icon K6 "Next" has been operated (step S23). If this key icon is found not operated, the CPU 101 returns to the input accepting screen (FIG. 7C) of step S21 for accepting ISP information and so on.

If key icon K6 "Next" is found operated in step S23, then the CPU 101 displays a screen (FIG. 7D) for accepting inputs such as mail account information, which is personal information of the mail user, in step S24, accepting the inputs such as mail account information entered by the user.

In step S25, the CPU 101 determines whether key icon K7 "Back" has been operated. If this key icon is found operated, the CPU 101 returns to the input accepting screen (FIG. 7C) of step S21 for accepting ISP information and so on. If key icon K7 "Back" is found not operated, then the CPU 101 determines in step S26 whether key icon K8 "Done" has been operated. If this key icon is found not operated, the CPU 101 returns to the input accepting screen (FIG. 7D) of step S24 for accepting mail account information and so on.

If key icon K8 "Done" is found operated in step S26, then the CPU 101 writes the ISP information and mail account information accepted by the input accepting screens shown in FIGS. 7C and 7C onto memory card 2 loaded in the terminal apparatus 1 in step S27.

If the user selected by the user selection screen is found in step S20 not a new user "New" but a registered user, then the CPU 101 issues a message prompting the input of the password for identifying that user.

In step S29, the CPU 101 determines whether the correct password has been entered by the user. If the correct password has not been entered by the user, the CPU 101 determines in step S30 whether key icon K5 "Back" has been operated. If this key icon is found operated, the CPU 101 returns to the user selection screen (FIG. 7B) of step S17. If key icon K5 "Back" is found not operated, the CPU 101 returns to step S20.

If the correct password is found entered in step S29, the CPU 101 displays in step S31 a screen, which is generally the same as the input accepting screen shown in FIG. 7C, this screen displayed in step S31 being filled up in columns of ISP information and so on with the information stored in the terminal apparatus 1 main for the selected registered user. This screen is displayed for the confirmation of the ISP information and so on for the registered user.

In step S32, the CPU 101 determines whether key icon K5 "Back" has been operated. If this key icon is found operated, the CPU 101 returns to the user selection screen (FIG. 7B) of step S17. If key icon K5 "Back" is found not operated, the CPU 101 determines whether key icon K6 "Next" has been operated (step S33). If this key icon is found not operated, the CPU 101 returns to the display screen (FIG. 7C) of step S31 displaying ISP information and so on.

In step S33, if key icon K6 "Next" is found operated, the CPU 101 goes to step S34 and displays a screen, which is generally the same as the input accepting screen shown in FIG. 7D, this screen displayed in step S31 being filled up in columns of mail account information and so on with the information stored in the terminal apparatus 1 main for the selected registered user. This screen is displayed for the confirmation of the mail account information and so on for the registered user.

In step S35, the CPU 101 determines whether key icon K7 "Back" has been operated. If this key icon is found operated, the CPU 101 returns to the display screen (FIG. 7C) of step S31 for displaying ISP information and so on. If key icon K7 "Back" is found not operated, then the CPU 101 goes to step S36 and determines whether key icon K8 "Done" has been operated. If this key icon is found not operated, the CPU 101 returns to the display screen (FIG. 7D) of step S34 for displaying mail account and so on.

If, in step S36, key icon K8 "Done" is found operated, the CPU 101 goes to step S27 and writes the ISP information and mail account information registered for the selected user stored in the terminal apparatus 1 main onto the memory card 2 loaded in the terminal apparatus 1. Therefore, in this case, the user can write the necessary ISP information and account information to the memory card 2 without reentering the ISP information and account information registered in the past.

Referring back to FIG. 3, if the function selected from the menu is the electronic mail capability in step S3, then the CPU 101 goes to step SB and determines whether the memory card 2 is loaded in the terminal apparatus 1. If the memory card 2 is found not loaded in the terminal apparatus 1, the CPU 101 displays a message on the display 12 prompting the loading of the memory card 2 (step S9). Then, if the escape key on the key operating section 11 is found pressed with the memory card 2 not loaded in the terminal apparatus 1 (step S10), the CPU 101 returns to the menu display screen of step S1.

Figure 6:
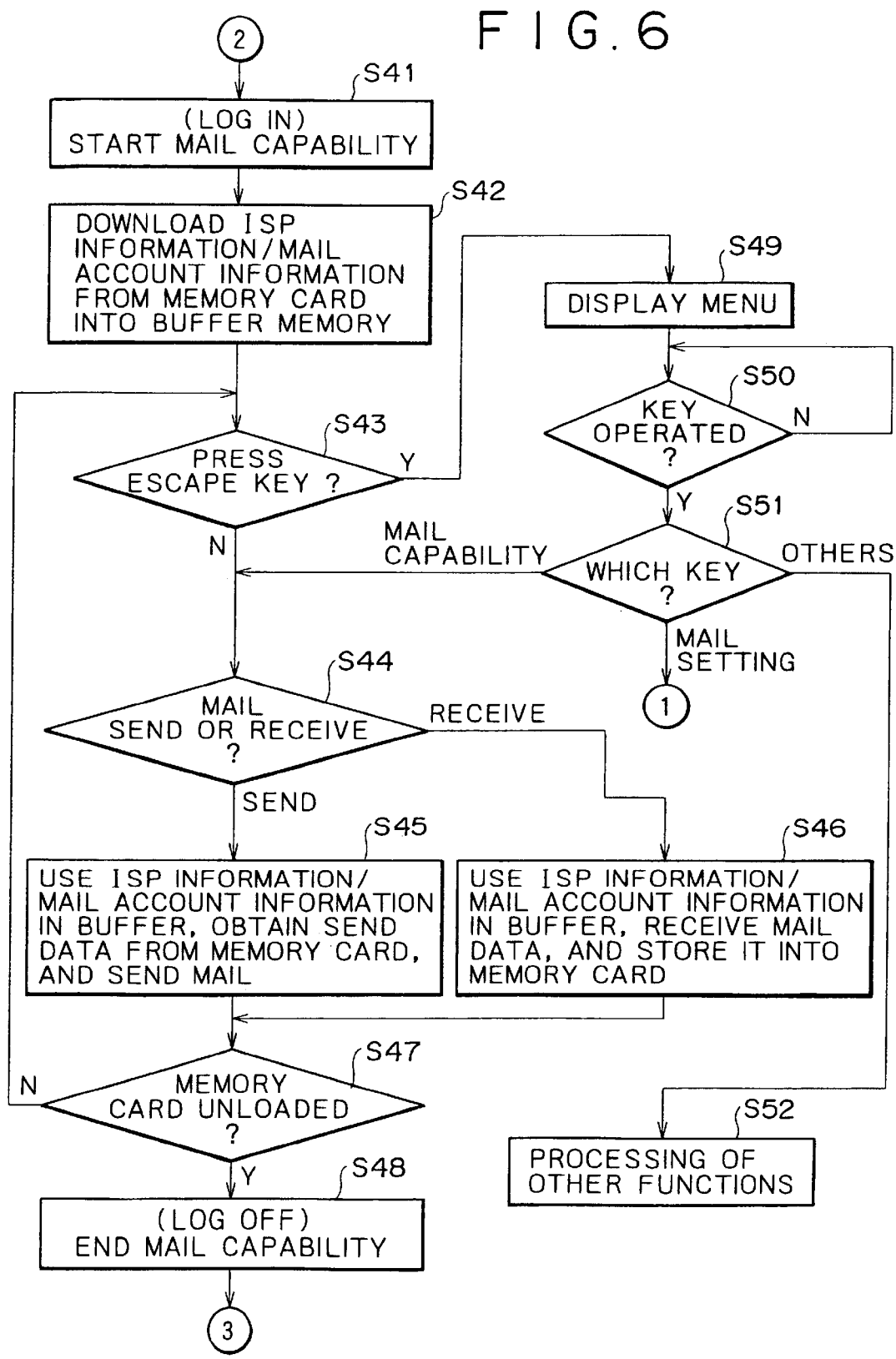
FIG. 6 is still another continuation to the flowchart shown in FIG. 3.

If the memory card 2 is loaded without pressing the escape key, the CPU 101 determines it in step S8 and starts the electronic mail execution processing routine shown in FIG. 6.

To be more specific, in step S41 of FIG. 6, the CPU 101 first starts the electronic mail capability. Namely, the CPU 101 confirms the loading of the memory card 2 and logs in the electronic mail application. Next, in step S42, the CPU 101 reads the information necessary for network connection access for electronic mail transfer from the memory card 2 and stores the ISP information and the mail account information into a buffer memory area in the RAM 104 of the terminal apparatus 1.

In step S43, the CPU 101 determines whether the escape key has been operated. If the user performs a mail send or receive operation without pressing the escape key, the CPU 101 executes the mail send or receive operation as follows.

If, in step S44, the operation performed by the user is found a mail send operation, the CPU 101 goes to step S45 and executes the mail send operation by use of the ISP information and the mail account information stored in the RAM 104. At this time, the mail data to be sent are already prepared in the memory card 2, so that the CPU 101 reads the send mail data from the memory card 2 and sends the mail to a destination specified by the user.

If, in step S44, the operation performed by the user is found a mail receive operation, the CPU 101 goes to step S46 and executes the mail receive operation by use of the ISP information and the mail account information stored in the RAM 104. The received data are stored in the memory card 2.

When the above-mentioned mail send or receive operation has been completed, the CPU 101 goes to step 47 and determines whether the memory card 2 has been unloaded from the terminal apparatus 1. If the memory card 2 is found not unloaded, the CPU 101 goes back to step S43 and repeats the mail send or receive operation until the user presses the escape key.

If, in step S47, the memory card 2 is found unloaded, the CPU 101 goes to step S48 and ends the electronic mail capability. To be more specific, the CPU 101 logs off the electronic mail application according to the unloading of the memory card 2. Then, the CPU 101 returns to the menu screen of step S1.

If, in step S43, the escape key is found pressed, the CPU 101 goes to step S49 and returns to the menu display screen with the mail application log-in state continued. Then, the CPU 101 goes to step S50 and monitors whether the user has operated any key in the key operating section 11. If any key is found operated, the CPU 101 goes to step S51 and determines which key has been operated.

If the operated key is found a function key other than the above-mentioned mail setting and mail execution (selection of the mail capability), the CPU 101 goes to step 52 and executes the processing of the selected function.

If the operated key is found for the mail setting capability, the CPU 101 goes to step S11. If the operated key is found for the mail capability, the CPU 101 goes to step S44 and executes the mail send or receive operation as described above.

Thus, in the present embodiment, the ISP information and mail account information necessary for electronic mail transfer are stored beforehand in the memory card 2 which can be loaded into and unloaded from the terminal apparatus 1. This memory card 2 is loaded in the terminal apparatus 1 to start the electronic mail capability, executing mail send and receive operations by use of the ISP information and the mail account information of the user stored in the memory card 2.

Consequently, the user need not set the ISP information and the mail account information to the terminal apparatus 1. Any user owning the memory card storing the ISP information and mail account information of his or her own can use the electronic mail capability by use of one terminal apparatus 1. Therefore, any number of users can execute the electronic mail capability by one common terminal apparatus 1. In addition, any terminal apparatus, as long as it has the same capabilities as those of the terminal apparatus 1 of the present embodiment, is available for electronic mail transfer by loading the above-mentioned memory card.

To increase the number of mail users with one terminal apparatus, the number of memory cards may only be increased in the present embodiment. Therefore, the terminal apparatus side need not prepare a memory size and settings by estimating the plural number of mail users. Each mail user can carry his or her memory card and load it into a terminal apparatus anywhere for electronic mailing.

Loading the memory card 2 allows the electronic mail capability to start and unloading the memory card 2 ends the electronic mail capability, thereby enabling the user to use the electronic mail capability without being aware of the log-in/log-out concept of the electronic mail capability. Therefore, the present invention allows users who are not well familiar with network communication to use the electronic mail capability with ease.

In addition, when plural users share one terminal apparatus, the mail management for each user is made on a memory card basis, thereby ensuring mail individuality and secrecy.

In the above-mentioned embodiment, when writing ISP information and mail account information to a new memory card, the user must make input settings for these pieces of information to the new memory card. It will be apparent that a memory card to which ISP information and mail account information have already been written may be distributed to the user. In this case, the user need not make cumbersome input settings such as mentioned above. Therefore, users not familiar with network communication can use the electronic mail capability with ease.

In the above-mentioned embodiment, ISP information and mail account information are transferred from the memory card 2 to the buffer memory of the terminal apparatus 1. It will be apparent that ISP information and mail account information may be read at execution of the electronic mail capability, thereby sending or receiving a mail without transferring these piece of information to the buffer memory.

It should be noted that the external memory for use on the terminal apparatus 1 is not limited to the memory card such as mentioned above. Any form of memory may be used if it can be loaded into and unloaded from the terminal apparatus 1.

In the above-mentioned embodiment, the terminal apparatus 1 has the electronic mail capability as one of network communication capabilities. It will be apparent that the present invention is also applicable to a terminal apparatus having a WWW browser capability as one of network communication capabilities as described in the beginning hereof.

The present invention is further applicable to a terminal apparatus having two or more network communication capabilities; for example, electronic mail and WWW browser capabilities. In this case, when one of these network communication capabilities is selected from the menu after loading of the memory card 2 into the terminal apparatus, it is put in the log-in state. Subsequently, the terminal apparatus is held in the log-in state until the memory card 2 is unloaded from the terminal apparatus.

Figure 3:
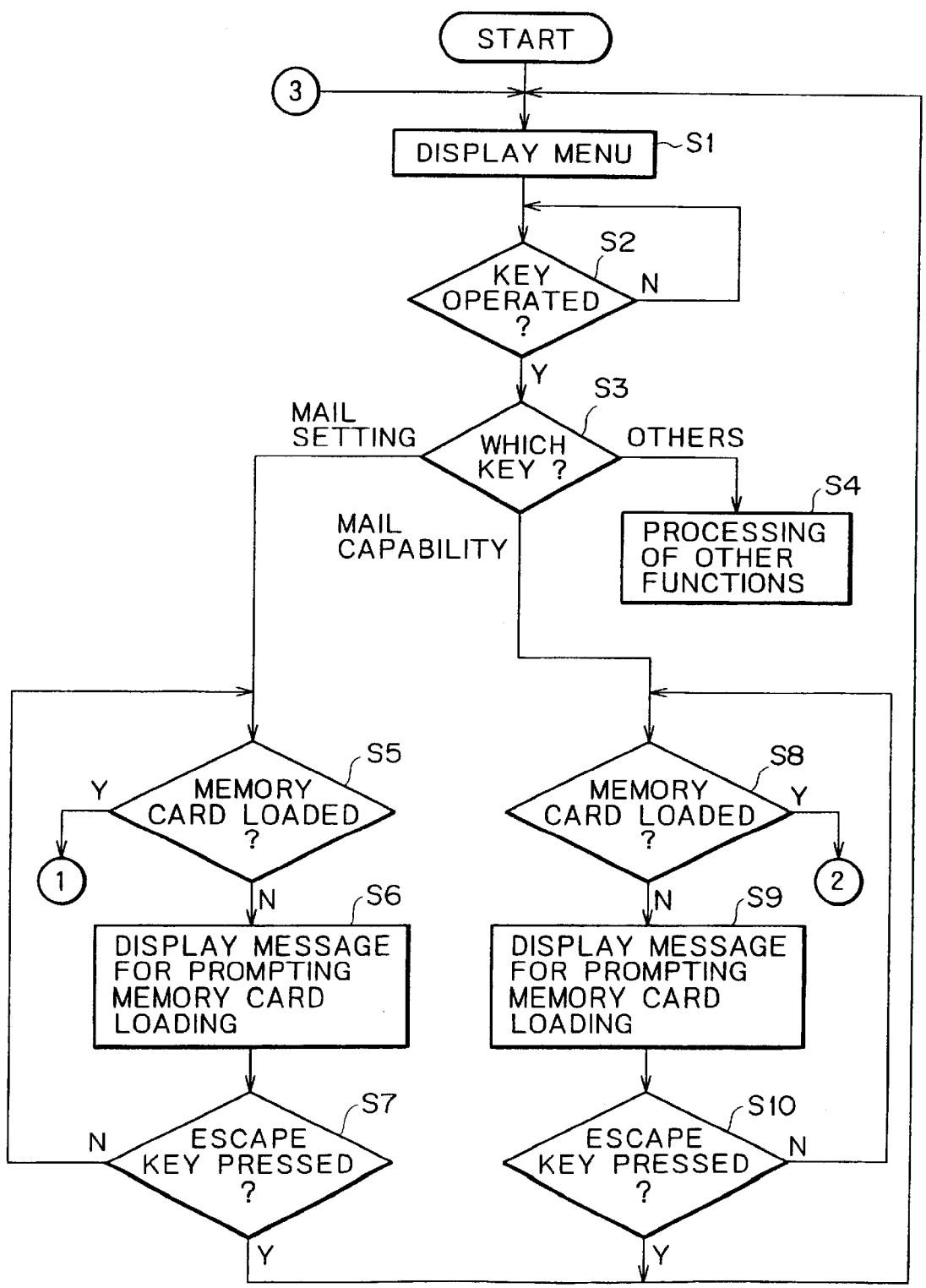
FIG. 3 is a flowchart for describing the mail information setting in and the network communication capabilities of the embodiment shown in FIG. 1.

Namely, in the above-mentioned embodiment, the menu display of step S1 shown in FIG. 3 is shown when the terminal apparatus is in the log-off state. The menu display of step S49 shown in FIG. 6 is shown when the terminal apparatus is in the log-in state. Therefore, when the other network capability is selected in the menu display of step S49, the selected network communication capability is executed from the log-in state for network communication.

As described and according to the invention, any user who has an external memory storing such information necessary for network communication as his or her own ISP information and account information can use such network communication capabilities of one common terminal apparatus as electronic mail. Further, the number of users who can use the one common terminal apparatus is not limited.

In addition, the concept of log-in/log-out of network communication applications can be realized the loading an external memory into and unloading it from the terminal apparatus, thereby allowing users not well familiar with network communication to intuitively understand the concept and use the network communication capabilities with ease.

Besides, the send data and receive data of electronic mail can be stored in the external memory, thereby facilitating to hold mail individuality and secrecy.

While the preferred embodiment of the present invention has been described using specific terms, such description is for illustrative purposes only, and it is to be understood that changes and variations may be made without departing from the spirit or scope of the appended claims.

What is claimed is:

1. A terminal apparatus having a network communication capability, the apparatus comprising:
    a loading section into which a removable external memory is loaded, wherein said removable external memory stores ISP (Internet Service Provider) information for an ISP and mail account information for only one user; and
    network communication capability executing means for reading said mail account and said ISP information for using said ISP as said network communication capability from said removable external memory loaded in said loading section, for executing a data transfer operation using said ISP by using said information having been read from said removable external memory, and storing data received using said ISP into said removable external memory, wherein
    said network communication capability is enabled only when said removable external memory is loaded in said loading section, and said network communication capability is automatically ended when said removable external memory is unloaded from said loading section.

2. The terminal apparatus having a network communication capability according to claim 1, further comprising:

setting input accepting means for accepting a setting input of said ISP information and said mail account information for using said network communication capability; and setting input information writing means for writing said setting input accepted by said setting input accepting means to said removable external memory loaded in said loading section.

3. A terminal apparatus having a network communication capability, the apparatus comprising:

a loading section into which a removable external memory is loaded, wherein said removable external memory stores ISP (Internet Service Provider) information for an ISP and mail account information for only one user;

external memory loading detecting means for detecting loading of said removable external memory in said loading section; and control means for making said network communication capability usable by reading said ISP information and said mail account information from said removable external memory when loading of said removable external memory in said loading section is confirmed by a detection output of said external memory loading detecting means, wherein said network communication capability is enabled only when said removable external memory is loaded in said loading section, and said network communication capability is automatically ended when said removable external memory is unloaded from said loading section.

4. The terminal apparatus having a network communication capability according to claim 3, wherein said network communication capability is an electronic mail capability and further comprising electronic mail capability executing means for sending and receiving electronic mail using said ISP and said mail account information read from said removable external memory.

5. The terminal apparatus having a network-communication capability according to claim 4, wherein said electronic mail is sent by reading mail data stored in said removable external memory.

6. The terminal apparatus having a network communication capability according to claim 4, wherein received mail data are stored in said removable external memory.

7. The terminal apparatus having a network communication capability according to claim 3, wherein said network communication capability is a WWW (World Wide Web) browser capability executing means for reading from said removable external memory loaded in said loading section information for using said WWW browser capability as said ISP and said mail account information, for establishing a network communication path using said read information, and for receiving data over said established network path.

8. A terminal apparatus having a network communication capability, the apparatus comprising:

a loading section into which a removable external memory is loaded and unloaded, wherein said removable external memory stores ISP (Internet Service Provider) information for an ISP and mail account information for only one user;

external memory unloading detecting means for detecting unloading of said removable external memory from said loading section;

communication capability executing means for executing said network communication capability by reading said mail account information and said ISP information for using said ISP as said network communication capability from said removable external memory loaded in said loading section; and control means for ending said network communication capability when unloading of said removable external memory from said loading section is confirmed by a detection output of said external memory unloading detecting means, wherein said network communication capability is enabled only when said removable external memory is loaded in said loading section, and said network communication capability is automatically ended when said removable external memory is unloaded from said loading section.

9. The terminal apparatus having a network communication capability according to claim 8, wherein said network communication capability is an electronic mail capability and said communication capability executing means sends and receives electronic mail using said ISP and said mail account information read from said removable external memory.

10. The terminal apparatus having a network communication capability according to claim 9, wherein said electronic mail is sent by reading mail data stored in said removable external memory.

11. The terminal apparatus having a network communication capability according to claim 9, wherein received mail data are stored in said removable external memory.

12. The terminal apparatus having a network communication capability according to claim 8, wherein said network communication capability is a WWW browser capability and said communication capability executing means reads, from said removable external memory loaded in said loading section, information for using said WWW browser capability as said ISP and said mail account information, establishes a network communication path using said read information, and receives data over said established network path.

13. A terminal apparatus having a network communication capability, the apparatus comprising:

a loading section into which a removable external memory is loaded and unloaded, wherein said removable external memory stores ISP (Internet Service Provider) information for an ISP and mail account information for only one user;

external memory loading/unloading detecting means for detecting loading and unloading of said removable external memory into and from said loading section; and control means for making said network communication capability usable by reading said ISP information and said mail account information from said removable external memory when loading of said removable external memory in said loading section is confirmed by a detection output of said external memory loading/unloading detecting means, and when said external memory loading/unloading detecting means detects unloading of said external memory from said loading section, ending said network communication capability based on said detection output of said external memory loading/unloading detecting means, wherein said network communication capability is enabled only when said removable external memory is loaded in said loading section, and said network communication capability is automatically ended when said removable external memory is unloaded from said loading section.

14. The terminal apparatus having a network communication capability according to claim 13, wherein said network communication capability is an electronic mail capability and further comprising electronic mail capability executing means for sending and receiving electronic mail using said ISP and said mail account information read out from said removable external memory.

15. The terminal apparatus having a network communication capability according to claim 13, wherein said network communication capability is a WWW (World Wide Web) browser capability and further comprising WWW browser capability executing means for reading from said removable external memory loaded in said loading section information for using said WWW browser capability as said ISP and said mail account information, for establishing a network communication path using said read information, and for receiving data over said established network path.

* * * * *